March 6, 1934.  A. K. EPSTEIN ET AL  1,949,791
SALAD DRESSING
Filed Nov. 16, 1929
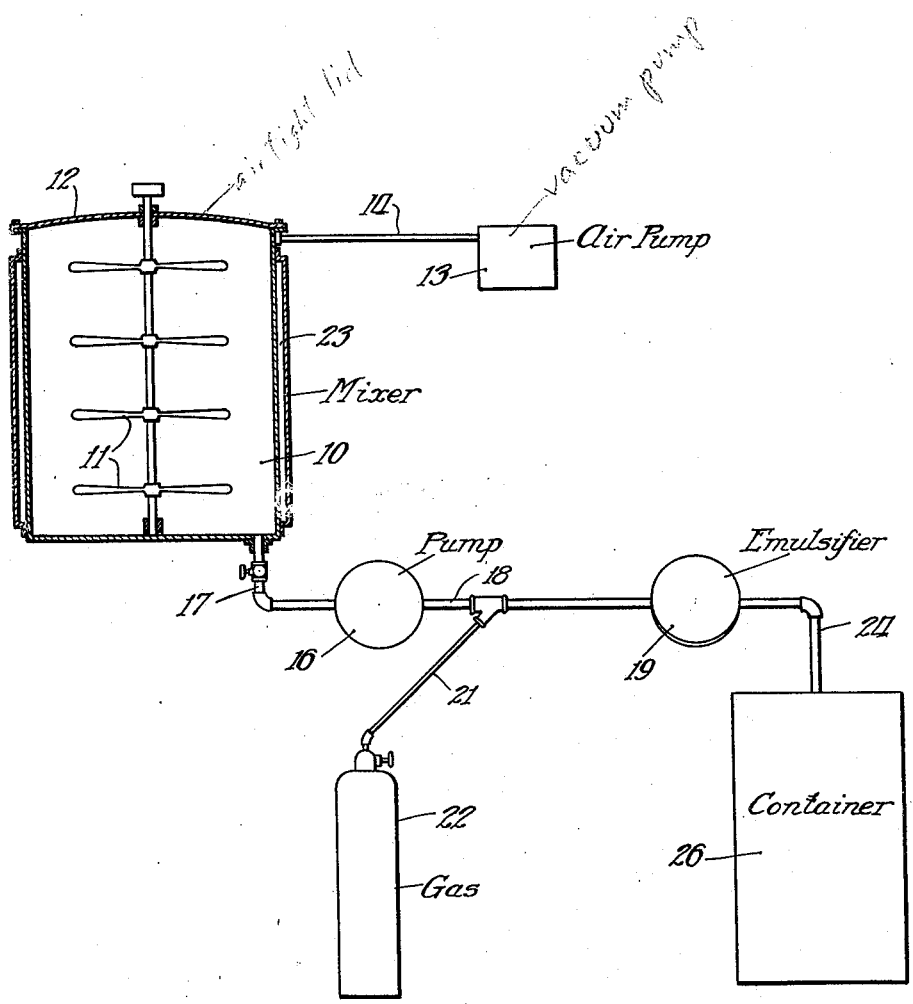
Inventors:
Albert K. Epstein
Marvin C. Reynolds
By George E. Mueller Patented Mar. 6, 1934

1,949,791

UNITED STATES PATENT OFFICE 1,949,791

SALAD DRESSING

Albert K. Epstein and Marvin C. Reynolds, Chicago, Ill.

Application November 16, 1929, Serial No. 407,713

8 Claims. (Cl. 99—11)

Our invention relates in general, to salad dressings, particularly mayonnaise, and has to do principally with an improved method of, and apparatus for, producing such dressings.

For the sake of clearness we shall refer throughout the present specification to the manufacture of mayonnaise dressing, but it will be apparent to those skilled in the art that the features of the invention are adapted for use in the manufacture of any of the ordinary dressings of this type.

Mayonnaise, as now produced, is either of the flowing, semi-flowing, or non-flowing type, and in general includes egg yolk, edible oils, an aqueous liquid such as vinegar, and seasoning material. The character of the mayonnaise produced depends partly upon the materials employed and partly upon the process to which they are subjected. The keeping qualities of mayonnaise which have not been satisfactory in the past are governed partly by the character of the emulsion and partly by the putrefiable character of the products contained. The elucidate, if the emusion is not sufficiently stable the ingredients will separate out after standing, making the mayonnaise unfit for table use. Assuming that the emulsion is sufficiently stable, oxidation occurs after the lapse of some time and the product is, for this reason, unsuited for use. One of the causes of oxidation in mayonnaise is the incorporation or trapping of air, the oxygen of which becomes rather intimately associated with the oxidizable portions of the product and spoilage results. Further, this condition is aggravated often by the production of a better emulsion, thereby entrapping more air than when an inferior emulsion accomplished with less beating exists.

A very great deal of experimental work has been done in recent years to improve the quality of mayonnaise. Better emulsifying materials are employed, and attempts have been made to avoid the trapping of air, and it has been suggested in the past that an inert gas be supplied in place of air. While improved results have been obtained by means of many of these suggestions, we have found that the product can be still further improved whether a fluid or non-fluid type of product is desired and therefore the principal object of our invention is to improve such products.

Another object is to produce a more stable emulsion and one which will also resist spoilage for a much greater length of time.

Another object is to introduce an inert gas in such a manner as to include such gas in a dispersed phase throughout the finished product.

Another object is to produce a lighter product and of smoother texture.

Other objects and features of the invention will be apparent from the consideration of the detailed description taken with the accompanying drawing, which consists of a schematic representation of a system adapted for use with our improved process.

In general, our process consists in first forming a preliminary mixture of all of the ingredients of the mayonnaise, then introducing a gas under pressure, and finally subjecting the entire product including the gas, to further and final emulsification, the final product, including a double emulsion with the oil and inert gas in dispersed phase, being discharged into a suitable container in substantially a continuous manner.

We shall now refer briefly to the apparatus which may be used in carrying out the process. All of the ingredients to be put into the mayonnaise are placed in a mixer 10 and subjected to a preliminary mixing step by means of beaters 11, the mixer provided with a lid 12, which can be made substantially air tight, and a vacuum pump 13 is provided with its intake line 14 communicating with the upper portion of the mixing container 10. A fluid pump 16 draws the mixed mayonnaise through a pipe 17 and discharges it into a pipe 18 connected with a suitable continuous emulsifying apparatus 19. For this purpose, a homogenizer, viscolizer, colloid mill, or any other suitable similar type of apparatus, by means of which the ingredients become subdivided and emulsified in a continuous manner, may be used. At a suitable point before the fluid reaches the emulsifier a gas intake pipe 21 is connected, pipe 21 being in communication with a source of gas 22, shown in the form of a carbon dioxide or nitrogen cylinder. The source of gas is arranged so that the gas may be introduced into the system at any desired pressure.

In carrying out the process with equipment of the type shown the eggs, oil, vinegar, and seasoning are introduced together into the container or churn 10 and a preliminary intermingling of these substances is brought about by means of the agitators. If desired, the container may be evacuated above the level of the mixture to avoid entrapping air, but in general, this is not necessary because the agitation is not continued for a sufficiently long time, nor is it violent enough to entrap any very great amount of air. In addition, the materials are all maintained in a sufficiently fluid state in the churn so that trapping of air is also reduced to a minimum. For the purpose of controlling the temperature in the churn, we employ suitable jacket 23, but, of course, other types of temperature control may be employed. When a preliminary mixture has been produced the pump 16 is started and at the same time gas is introduced into the line 18 so that the mayonnaise advancing into the emulsifier 19 is mixed with a suitable amount of inert gas and the entire product including the gas is completely emulsified in the apparatus, being discharged through the pipe 24 into the container 26. During the operation of the pump the agitator in the churn is preferably continued in motion to avoid any possible separation of the constituents of the mayonnaise as will be apt to occur more readily under some circumstances. While we find it unnecessary to use any very great care in the introducing of the materials into the mixer or churn 10, we prefer to do this in the usual manner now employed in the art, which consists in first introducing the emulsifying agents including the egg yolks, and then while operating the agitator 11 introduce the other constituents such as spices, vinegar and oil.

By our process the amount of gas introduced will be greater than that usually dispersed in the constituents of the mayonnaise in view of the fact that the gas is emulsified simultaneously with all of the other constituents of the emulsion and will form a gas-water emulsion as well as gas films around the oil globules. The resulting product will be lighter and smoother in texture, as it will contain no air pockets or open spaces as at present. The product obtained is of a flowing type substantially free of air but also containing carbon dioxide or nitrogen which will give it lightness, smoothness and a different consistency. The product will also keep for a much greater length of time as it will not have an oxidizing gas dispersed therethrough.

If it is desired to manufacture a mayonnaise of a semi-solid consistency, which will not flow from a bottle, it is necessary to adjust the formula in such a manner so as to reduce the amount of liquid and premix all ingredients in a suitable tank and then inject the gas before the unstable mixture enters the final emulsification machine.

In this case, a colloid mill may be used with revolving discs or cones and the space between the cones or discs may be adjusted in such a manner so as to give the product sufficient trituration without any emulsification breaking it down.

In the case of making a heavier type of mayonnaise, by a continuous process, the gas which is introduced may be either air, or an atmosphere, which does not contain any oxygen such as carbon dioxide or nitrogen. In such event, it may also be desirable to have the premixing made in a tank free of oxygen.

At the stage of the process which deals with the premixing of the ingredients, a temperature must be used sufficiently high enough to keep all the ingredients at a flowing condition and this temperature must also be maintained when this premixed, unstable mixture is pumped through the pipes and admixed with the gas and finally subjected to the final emulsification process.

One of the advantages of this process consists in that it is possible to make any type of mayonnaise rather of the more flowing type or the type which does not flow readily from a bottle by a continuous process and in large batches.

It is also possible to make a thin flowing mayonnaise which is previously mixed in an atmosphere free of oxygen by having an inert gas emulsified in the product.

It is also possible by means of this invention to make a heavy type of mayonnaise by a continuous process, whereby all ingredients are emulsified simultaneously at ordinary temperatures going through simultaneouly and continuing with a gaseous atmosphere and having an amount of gas dispersed in it which is larger than that made by continuous and simultaneous emulsification of ingredients or without the introduction of the gas before the final emulsification.

To further illustrate the process, we are giving an example of a mayonnaise of a more flowing type; about 95 pounds of yolk are introduced into the tank in which is mixed 300 pounds of oil, and into which 150 pints of vinegar are introduced together with a sufficient amount of mustard, salt and sugar to give it the desired taste and flavor. These constituents are mixed in tanks in the absence of air and then carbon dioxide or nitrogen is introduced under a suitable pressure. This will result in a product which will be of a semi-flowing type and which will contain an inert gas emulsified therein, which will keep the product in very good condition.

The volume obtained will be larger than that made without introducing the gas as shown in the specification, the product will have a lighter gravity. On account of the dispersed gas, it will have a distinctive taste. If a heavier type of mayonnaise is desired, a larger amount of oil is used, so for example, 450 pounds of oil are introduced into the tank and emulsified into 45 pounds of commercial yolk together with spices and aqueous liquid such as vinegar together with 52 pints of vinegar.

All these substances are mixed with stirring in the tank. This may be done in the absence of air, if a product is desired with longer keeping qualities.

It is then pumped through while the stirring is continued to prevent gravitational separation and admixed in an inert atmosphere of carbon dioxide under pressure and the premixed, unstable emulsion admixed with the carbon dioxide is then introduced by means of the pump through a colloid mill, which has a revolving cone against a stationary cone, or a revolving disc against a stationary disc with approximately 1/80" of space between the moving and stationary parts.

At this point, the gas becomes intimately emulsified in the aqueous liquid egg material and the oil becomes subdivided and the resultant product will be of a semi-solid consistensy and will contain an amount of inert gas greater than that dissolved.

What we claim is new and desire to protect by Letters Patent of the United States is:—

1. A process for producing mayonnaise which includes assembling the usual required ingredients in a suitable container, forming a preliminary mixture of such ingredients in the container, withdrawing the resulting mixture continuously in a flowing stream from the container for transfer to a suitable emulsifying apparatus, introducing an inert gas into the mixture during its path to such emulsifying apparatus, and finally treating the combined mixture and gas in the emulsifier to complete the emulsion.

2. A process for producing mayonnaise which includes assembling the usual required ingredients in a suitable container, forming a preliminary mixture of such ingredients in the container, in the presence of a vacuum, withdrawing the resulting mixture continuously in a flowing stream from the container for transfer to a suitable continuous emulsifying apparatus, introducing an inert gas into the mixture during its path to such emulsifying apparatus, and finally treating the combined mixture and gas in the continuous emulsifier to complete the process of emulsification.

3. A process for producing mayonnaise, which includes assembling the usual required ingredients in a suitable large container, evacuating the container, forming a preliminary mixture of such ingredients in the container, removing the preliminary mixture from the container and transferring the same continuously to an emulsifier for final emulsification, and continuously supplying an inert gas to the mixture after it leaves the container, but before final treatment in the emulsifier.

4. A process for producing mayonnaise, which includes assembling the usual required ingredients in a suitable large container, forming a preliminary mixture of such ingredients in the container, pumping the mixture from the container continuously to an emulsifier, and supplying an inert gas to the mayonnaise after the mixture has been made but before final emulsification.

5. A process for producing mayonnaise, which includes assembling the usual required ingredients in a suitable large container, evacuating the container, forming a preliminary mixture of such ingredients in the container, pumping the mixture from the container continuously to an emulsifier, and supplying an inert gas to the mayonnaise after the mixture has been made but before final emulsification.

6. A process for producing mayonnaise, which includes assembling the usual required ingredients in a suitable container, forming a preliminary mixture thereof, withdrawing the mixture in a small stream continuously from the container, supplying continuously to the stream, an inert gas under pressure, whereby such gas mixes with the stream and moves therewith, and emulsifying said mixture and gas together continuously in a suitable emulsifier.

7. A process for producing mayonnaise, which comprises bringing together proper proportions of oil, aqueous material, seasoning and emulsifying agent, forming a preliminary mixture of such materials, delivering the mixture under pressure through a closed passageway to an emulsifying apparatus, passing an inert gas under pressure into the passageway, whereby to deliver said gas to the emulsifying apparatus with the mixture, and continuously emulsifying said mixture and gas to form a stable mayonnaise emulsion.

8. A process for producing mayonnaise, which comprises delivering oil and aqueous liquid out of contact with the air in measured proportions through a closed passageway to an emulsifying mechanism capable of continued operation, introducing an inert gas into said materials in said closed passageway, and then emulsifying said oil and aqueous material continuously to produce the final mayonnaise product.

ALBERT K. EPSTEIN.
MARVIN C. REYNOLDS.